Nov. 19, 1957   J. M. HAUSMAN   2,813,300
DOUBLE CYLINDER AND RAM TYPE PLASTIC MIXING APPARATUS
Filed Oct. 18, 1954
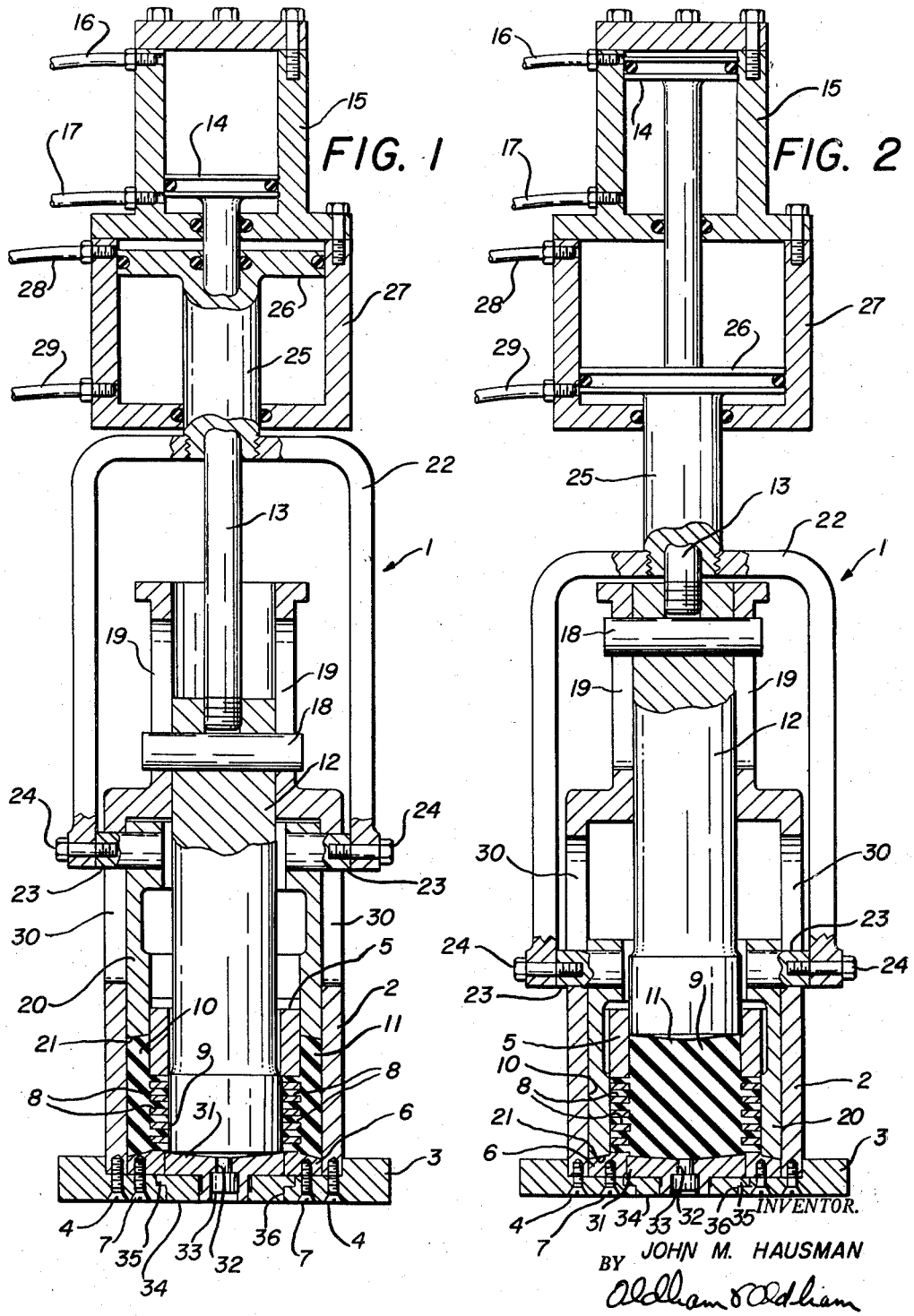
INVENTOR.
JOHN M. HAUSMAN
BY Oldham & Oldham
ATTORNEYS

United States Patent Office 2,813,300
Patented Nov. 19, 1957

2,813,300

DOUBLE CYLINDER AND RAM TYPE PLASTIC MIXING APPARATUS

John M. Hausman, Stow, Ohio

Application October 18, 1954, Serial No. 462,775

6 Claims. (Cl. 18—2)

This invention relates to plastic mixing apparatus, and especially is of the type used for working and/or kneading of natural or synthetic rubber or other plastic material to render it more plastic, and/or for mixing compounding ingredients therewith.

At the present time in the rubber working industries, crude natural rubber from the plantation is usually subjected to a "break-down" or plastizing operation prior to attempting to mix any compounding ingredients therewith. Thus such operation is first performed upon the rubber after which the rubber and suitable compounding ingredients, such as carbon black, may be placed into what is called a banbury mixer and the rubber is thoroughly kneaded and mixed with this compounding material to make what is called a master batch. Thereafter yet a third operation of mixing and/or kneading the rubber is performed by mixing such master batches of rubber with other compounds, materials such as compounding ingredients, natural or synthetic rubber materials, etc. upon rubber mixing mills to provide the actual batch of rubber for use in making a given article.

In making many rubber articles, such as rubber tire or treads, the rubber material or composition, after it has had the three different operations performed thereon by three different machines as set forth hereinabove, is transmitted to an extrusion apparatus in which the plasticized, compounded rubber is further processed and is extruded therefrom as a continuous article of the cross-sectional contour desired.

Other similar operations are performed in many instances upon synthetic materials such as synthetic rubber and rubber-like materials, while yet other plastic materials may be processed similarly to the operations referred to hereinbefore as being performed upon natural rubber.

The general object of the present invention is to provide a new and improved machine for plasticizing and/or compounding plastic materials and replacing one or more previous conventional types of plastic compounding and/or processing apparatus.

Another object of the invention is to provide a unitary machine which can perform both plasticizing, compounding and extruding operations upon plastic materials.

A further object of the invention is to provide a double cylinder, ram type of a plastic processing machine wherein plastic material is processed by forcing it to flow back and forth between apertures connecting the two cylinders of the machine together.

A further object of the invention is to reduce the cost of the machinery used for processing and/or compounding plastic materials, and to reduce the amount of labor involved in such operations.

Yet another object of the invention is to control, positively, the movement of plastic material in processing apparatus so that all of the material in one batch, or in a plurality of batches can be uniformly processed.

The foregoing and other objects and advantages of the invention will be made more apparent as the specification proceeds.

For a better understanding of the invention, reference should be had to the accompanying drawings, wherein:

Fig. 1 shows a longitudinal section through one type of apparatus embodying the principles of the invention and showing the plungers in the cylinders in one position; and Fig. 2 is a longitudinal section similar to Fig. 1 but with the rams in the apparatus being oppositely positioned and ready for discharge of material from the apparatus.

In referring to corresponding parts shown in the drawings and referred to in the specification, corresponding numerals are used to facilitate comparison between such corresponding parts.

The present invention relates to apparatus for working, mixing and/or processing plastic materials, such as natural rubber, and comprises means defining a pair of inner and outer chambers having a common wall separating the chambers and having apertures in the common wall connecting the chambers together, and separate individually movable ram means are provided in each of the chambers. Means are present in the apparatus for individually and alternately actuating such ram means to move them longitudinally of the chambers and force plastic material therein back and forth between the chambers through the apertures connecting them. The outer chamber has a permanently closed end, while a closure having a closed aperture therein is provided for the end of the inner chamber, means removably positioning such closure, and a discharge die is removably engaged with the aperture in the closure for discharge of plastic from the apparatus at desired times.

It should be understood that the apparatus disclosed in the accompanying drawings and described in detail herein is one embodiment of apparatus showing the principles of the invention and is for illustration purposes only and that this machine could be modified relatively widely and still conform to the principles of the invention. For example, the apparatus could be operated either as a horizontally positioned machine, as shown, or as a vertically positioned machine, and any desired type of means can be provided for opening and closing the apparatus for charging plastic material therein.

The apparatus of the invention is indicated as a whole by the numeral 1. This processing apparatus for plastic materials includes a tubular frame 2 which may be secured, for example, to an end or base plate 3 by removable means, such as cap screws 4. The tubular frame 2 can be positioned by any suitable means (not shown) and normally would be secured in a fixed position for operative action.

As an important feature of the invention, two separate compartments are provided in the apparatus 1 and to this end an inner sleeve or cylinder 5, is provided in the apparatus and may be positioned, for example, by means of an enlarged diameter end plate 6 preferably integrally formed with one end of the sleeve 5, as shown in the drawings. The end plate 6 is suitably positioned, as by use of cap screws 7 engaging the end plate 3, that secure the sleeve 5 in radially spaced but preferably concentric relation to the tubular frame 2. For a purpose to be described hereinafter in more detail, a plurality of apertures 8 of any desired reasonable size and shape are formed in the sleeve 5 adjacent the end plate 6. These apertures 8 serve to connect the inner and outer cylinders or chambers provided in the tubular frame 2, as an inner chamber 9 is provided within the sleeve 5 while an outer chamber 10 is provided intermediate the bore of the tubular frame 2 and the periphery of the sleeve 5. The inner and outer chambers 9 and 10 are provided for receiving plastic material 11 therein and are of the same volume in size. The plastic material is adapted to be forced to flow through the apertures 8 and move from the inner chamber 9 to the outer chamber 10, or vice versa, dependent upon action of the ram pusher means, herein after described, provided in such chambers.

The drawings clearly show that a solid ram 12 is received in the inner chamber 9 and tightly fills the bore of the sleeve 5. Such ram or piston 12 has a control rod or connecting rod 13 extending therefrom and shown connected to a piston 14 received in a hydraulic cylinder 15. This cylinder 15 has hydraulic fluid supply lines 16 and 17 connected thereto for forcing fluid into and out of the cylinder 15 from opposite ends thereof for engaging the piston 14 to move the piston rod 13 along its longitudinal axis and thus control movement of the ram 12 in the apparatus of the invention. The drawings indicate that the ram 12 may have a guide pin 18 secured therein and extending therefrom for engaging slots 19, which slots are diametrically opposed in the sleeve 5, to guide and control motion of the ram 12 in the sleeve 5.

A second control ram 20 is provided in the apparatus and is of tubular construction of a size to be snugly received in the outer chamber 10. The ram 20 has a tapered end indicated at 21, which ram end is complementary in shape to a tapered surface provided on the end plate 6 for the sleeve 5. Thus a tight fit can be secured between such ram end and its end plate to fill or occupy the outer chamber 10 completely. Hence any plastic material 11 positioned in such outer chamber can be forced therefrom through the apertures 8 when the tubular ram 20 is moved to its position, as shown in Fig. 2.

The action of the tubular ram 20 is controlled by means of a yoke 22 secured to the ram 20 by control bars or rods 23 suitably secured to the ram 20, and with the yoke 22 being engaged with the rods 23 by cap screws 24 or similar members. The yoke 22 connects to a tubular piston rod 25 which is shown formed integrally with a piston 26. This piston rod 25 is shown as in encompassing, slidable or telescopic engagement with the piston rod 13 for movement independently of such piston rod. The piston 26 is received in a hydraulic cylinder 27 and fluid pressure supply lines 28 and 29 connect to opposite ends of such hydraulic chamber for forcing the piston to move in either desired direction within the hydraulic cylinder 27. Conventional types of sealing means are associated with the hydraulic cylinders 15 and 27 so that fluid does not escape therefrom when such piston rods 13 and 25 are operated.

The control rods or pins 23 extend through a pair of diametrically opposed slots 30 formed in the sleeve 5, and with the longitudinal motion of the tubular ram 20 being limited so that it cannot be completely withdrawn from engagement with and positioning between the inner sleeve 5 and the adjacent portion of the tubular frame 2.

The apparatus 1 is adapted to have plastic materials charged thereinto in this embodiment of the invention through means associated with the end plates 3 and 6, while plastic material also is discharged from such portion of the apparatus. Thus a closure or extrusion plate 31 is provided and it normally has an axially extending bore 32 provided therein. This bore 32 may receive a closure plug 33 therein when the apparatus 1 is used for plastic mixing and/or plastizing operations. However, when materials are to be discharged from the apparatus 1, the plug 33 would be removed and any suitable type of an extrusion die could be substituted therefor, or the entire opening could be left available for flow of plastic material from the apparatus, as desired. The closure plate 31 preferably is held in place by a retainer ring 34. This retainer ring 34 has circumferentially spaced lugs 35 thereon forming a bayonet joint with correspondingly positioned lugs 36 provided on the end plate 3. Conventional means (not shown) are associated with the retainer ring 34 to retain it in locked position to hold the closure plate 31 firmly in a given operative condition.

In use, the plastic material 11 would be charged into the inner chamber 9 by removal of the closure plate 31. After such closure plate and plug 33 are repositioned the plastic will be alternately forced to and from the outer chamber 10 by alternate strokes of the rams 12 and 20 until the desired compounding, plastizing or other action has been secured. Movement of the ram 12 with the apparatus as illustrated in Fig. 2 then is effected to discharge the plastic through the bore 32 or a die positioned therein.

It will be realized that in some instances it may be desirable to use types of control means other than the hydraulic cylinders shown for the different compressive rams of the invention.

The apertures 8 may be of any desired shape and would, for example, have a maximum opening of from about ¼" to 2" dependent upon the material being processed and the action being performed thereon.

However, by the apparatus, positive means are provided for controlling the flow or movement of plastic material between two connected chambers so that a plastizing, break-down, working, mixing, kneading, warming or compounding action is secured upon the plastic material by forcing it to flow between the connected chambers. Hence the apparatus can be used as a substitute for a plastizer machine, a banbury mixer, a mixing mill, an extrusion cylinder and/or a warm up mill, and perform any and all of the functions of such multiplicity of machines. Thus it is contended that the relatively inexpensive but powerful machine of the invention has achieved the objects of the invention.

While one complete embodiment of the invention has been disclosed herein, it will be appreciated that modification of this particular embodiment of the invention may be resorted to without departing from the scope of the invention as defined in the appended claims.

What is claimed is:

1. Apparatus for working, mixing and/or processing plastic materials comprising a pair of radially spaced, concentric, aligned hollow cylinders, a closure for one corresponding end of each of said cylinders, ram means for the inner of said cylinders, and ram means adapted to reciprocate in the space between said cylinders, said inner cylinder having apertures therein adjacent its closed end for passage of plastic therethrough from one of said cylinders to the other with opposite movement of said ram means.

2. Apparatus for working, mixing and/or processing plastic materials comprising a pair of radially spaced telescoped hollow cylinders, a closure for one corresponding end of each of said cylinders, ram means for the inner of said cylinders, ram means adapted to reciprocate in the space between said cylinders, said inner cylinder having apertures therein adjacent its closed end for passage of plastic therethrough from one of said cylinders to the other with movement of said ram means, means for moving said ram means, and means for opening at least one of said cylinders.

3. Apparatus for working, mixing and/or processing plastic materials comprising a pair of radially spaced concentric hollow cylinders, a closure means for one corresponding end of each of said cylinders, ram means for the inner of said cylinders, tubular ram means adapted to reciprocate in the space between said cylinders, said inner cylinder having apertures therein adjacent its closed end for passage of plastic therethrough from one of said cylinders to the other with movement of one of said ram means towards said closure means, and discharge means for said cylinders.

4. Apparatus for working, mixing and/or processing plastic materials comprising means defining a pair of telescoped inner and outer chambers having a common wall separating such chambers and having apertures in said common wall, separate ram means in said chambers to force plastic material in said chambers through said apertures, said outer chamber having a permanently closed end, a closure having an aperture therein for an end of said inner chamber, and means removably positioning said closure.

5. Apparatus for working, mixing and/or processing plastic materials comprising means defining a pair of concentric inner and outer chambers having a common wall separating such chambers and having apertures in said common wall by which such chambers are connected together, separate ram means in each of said chambers, means for individually actuating said ram means to move such means longitudinally of said chambers and force plastic material in said chambers back and forth therebetween through said apertures, said outer chamber having a permanently closed end, a closure having a closed aperture therein for an end of said inner chamber, means removably positioning said closure, and a discharge die engageable with said aperture in said closure for discharge of plastic from the apparatus.

6. Apparatus for working, mixing and/or processing plastic materials comprising inner and outer sleeves defining a pair of concentric inner and outer chambers having a common wall separating such chambers and having apertures in said common wall by which such chambers are connected together, separate inner and outer ram means in and adapted to fill each of said inner and outer chambers, a hydraulic cylinder means for each of said ram means to move such means longitudinally of said chambers and force plastic material in said chambers to flow therebetween through said apertures, said outer chamber having a permanently closed end, a closure having an aperture therein for an end of said inner chamber, means removably positioning said closure in engagement with said inner chamber, and a discharge die engageable with said aperture in said closure for discharge of plastic from the apparatus through such die.

References Cited in the file of this patent
UNITED STATES PATENTS

| | | |
|---|---|---|
| 90,766 | Clelland | June 1, 1869 |
| 600,953 | Rabbi et al. | Mar. 22, 1898 |